(12) United States Patent
Yamashita et al.

(10) Patent No.: US 6,921,208 B2
(45) Date of Patent: Jul. 26, 2005

(54) DYNAMIC BEARING DEVICE AND METHOD FOR MAKING SAME

(75) Inventors: Nobuyoshi Yamashita, Kuwana (JP); Tetsuya Kurimura, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 110 days.

(21) Appl. No.: 10/364,660

(22) Filed: Feb. 10, 2003

(65) Prior Publication Data

US 2003/0169952 A1 Sep. 11, 2003

(30) Foreign Application Priority Data

Feb. 20, 2002 (JP) ........................................ 2002-042629

(51) Int. Cl.⁷ ............................................. F16C 32/06
(52) U.S. Cl. ..................................................... 384/107
(58) Field of Search ................................. 384/100, 107, 384/111–115, 121

(56) References Cited

U.S. PATENT DOCUMENTS 6,390,681 B1 * 5/2002 Nakazeki et al. ........... 384/107
6,499,882 B2 * 12/2002 Takahashi et al. .......... 384/107
6,712,514 B2 * 3/2004 Mori et al. .................. 384/107
2002/0064324 A1 * 5/2002 Yamada ...................... 384/107

* cited by examiner

Primary Examiner—Thomas R. Hannon
(74) Attorney, Agent, or Firm—J. C. Patents

(57) ABSTRACT

The thrust member is inserted into the inner circumferential surface of the housing, to make the end face of the thrust member contact with the lower side end face of the flange portion, and at the same time, to make the upper side end face of the flange portion contact with the lower side end face of the bearing sleeve. This stated is that the thrust bearing gap is zero. Then, the thrust member is made to relatively move with respect to the housing and the bearing sleeve in the axial direction together with the axis member, with a dimension $\delta(\delta=\delta_1+\delta_2)$ that is equivalent to the sum of the thrust bearing gap (size is $\delta_1$) of the first thrust bearing portion and the thrust bearing gap (size is $\delta_2$) of the second thrust bearing portion. Then, as the thrust member is fixed to the housing at that position, the predetermined thrust bearing gap $\delta(\delta=\delta_1+\delta_2)$ is formed.

8 Claims, 13 Drawing Sheets

DYNAMIC BEARING DEVICE AND METHOD FOR MAKING SAME

CROSS-REFERENCE TO RELATED APPLICATION

This application claims the priority benefit of Japanese application Ser. No. 2002-42629, filed on Feb. 20, 2002.

BACKGROUND OF THE INVENTION

1. Field of the Invention

This invention relates in general to a dynamic bearing device (a fluid dynamic bearing device) for supporting a rotational member in a non-contact manner by a dynamic action of lubrication oil generated in a bearing gap. The bearing device is suitable for a spindle motor of an information machine, for example, a magnetic disk device such as HDD, FDD, an optical disk device such as CD-ROM, CD-R/RW, DVD-ROM/RAM, and a magnetic optical disc device such as MD, MO; a polygon scanner motor of a laser beam printer (LBP); or a small-size motor of an axial flow fan, etc. in an electronic equipment.

2. Description of Related Art

For various motors mentioned above, in addition to high rotational accuracy, high speed, low cost and low noise etc., are requested. One of the constructional elements that define these requested performances is a bearing that supports a spindle of the motor. Recently, for such a kind of the bearing, a dynamic bearing superior in the above requested performances has been considered to be used, or has been implemented in practice.

For example, a dynamic bearing device, which is installed in a spindle motor of a disk device such as HDD, comprises a radial bearing portion for rotatably supporting an axis member in a non-contact manner in the radial direction, and a thrust bearing portion for rotatably supporting the axis member in a non-contact manner in the thrust direction. For each of these bearing portions, a dynamic bearing that has dynamic pressure generating grooves formed on a bearing surface thereof is used. The dynamic pressure generating grooves of the radial bearing portion are formed on an inner circumferential surface of a bearing sleeve or an outer circumferential surface of the axis member. The dynamic pressure generating grooves of the thrust bearing portion, when using an axis member with a flange portion, are formed on both end faces of the flange portion, or on surfaces opposite thereto (for example, on an end face of the bearing sleeve, an end face of a thrust member disposed on a bottom portion of a housing and the like), respectively. Conventionally, the bearing sleeve is fixed to a predetermined position on an inner circumference of the housing. Additionally, when the bottom portion of the housing is formed with the thrust member, a step portion for positioning the thrust member is often formed on the housing (the positioning of the thrust member with respect to the housing is performed by fitting the thrust member to the step portion). Furthermore, in order to prevent the lubrication oil that is filled into the internal space of the housing from externally leaking, a sealing member is often disposed at an opening portion of the housing.

The aforementioned dynamic bearing device comprises parts such as the housing, the bearing sleeve, the axis member, the thrust member and the sealing member. In order to secure high bearing property required as the information equipment getting more and more high performances, efforts for improving accuracy of each part and accuracy of assembling have been made. In particular, the dimension of the thrust bearing gap is affected by accuracy of parts, such as the axial dimension of the flange portion of the axis member, the surface accuracy of the both end faces of the flange portion, the surface accuracy of the end faces of the bearing sleeve and the thrust member that form thrust bearing surfaces, and by accuracy of assembling, such as the axial space between the bearing sleeve and the thrust member, so that it is very difficult to control the dimension of the thrust bearing gap to be within the desired value. As a result, in the actual situation, it is forced to perform processes of parts with higher accuracy or more complicate assembling than necessary. Meanwhile, accompanying the low cost trend for the information equipment, a request to the dynamic bearing device for lowering cost becomes to be more and more severe.

SUMMARY OF THE INVENTION

According to the foregoing description, it is an object of the invention to provide a dynamic bearing device for further decreasing its cost.

It is another object of the invention to provide a dynamic bearing device that is superior in bearing property, in which a thrust bearing gap is accurately formed.

It is yet another object of the invention to provide a method capable of easily and accurately setting a thrust bearing gap in a dynamic bearing device.

According to the objects mentioned above, the invention provides a dynamic bearing device, which comprises a housing, a bearing sleeve fixed to the inner circumference of the housing, an axis member having an axis portion and a flange portion, a thrust member fixed to the housing, a radial bearing portion, arranged between an inner circumferential surface of the bearing sleeve and an outer circumferential surface of the axis portion, for supporting the axis portion in a non-contact manner in the radial direction under a dynamic action of lubrication oil generated in the radial bearing gap, a first thrust bearing portion, arranged between one end face of the bearing sleeve and one end face of the flange portion opposite thereto, for supporting the flange portion in a non-contact manner in the thrust direction under a dynamic action of lubrication oil generated in a thrust bearing gap, and a second thrust bearing portion, arranged between an end face of the thrust member and the other end face of the flange portion opposite thereto, for supporting the flange portion in a non-contact manner in the thrust direction under a dynamic action of lubrication oil generated in the thrust bearing gap, wherein the position of the thrust member with respect to the housing is set, with using the one end face of the bearing sleeve positioned at a predetermined position on the housing as a reference, and thereby, the thrust bearing gaps of the first thrust bearing portion and the second thrust bearing portion are formed with a predetermined dimension.

For example, in a structure where a position setting of a thrust member is performed by a step portion, i.e., the positioning of the thrust member with respect to a housing is performed by fitting the thrust member to the step portion, the thrust bearing gap is affected by the assembling accuracy of the bearing sleeve to the housing (the axial dimension between the step portion and the end face of the bearing sleeve). In addition, because the positioning of the bearing sleeve to the housing requires a special tool, when the parts are finally assembled together, the thrust bearing gaps are affected by the surface accuracy of the thrust surfaces (both end faces of the flange portion, end faces of the bearing sleeve and the thrust member). In contrast, according to the present invention, because the position of the thrust member with respect to the housing is set with using the one end face of the bearing sleeve positioned at the predetermined position on the housing as a reference, the thrust bearing gaps are not affected by the assembling accuracy of the bearing sleeve with respect to the housing or the surface accuracy of the thrust surfaces. Therefore, the thrust bearing gaps can be more accurately formed, and thereby, the bearing property can be further improved. Moreover, the manufacturing cost of the dynamic bearing device can be reduced because it is not necessary to perform processes of parts with higher accuracy or more complicate assembling process than necessary in order to form the thrust bearing gaps accurately.

In the above structure, the housing can be made of a metal or resin (such as an injection molded product of a resin). When the housing is made of a metal, die casting product such as aluminum alloy, press worked product such as metal plate (drawing press worked product), mechanical processed product of a metal such as brass (turned product), or injection molded product of a metal powder can be used.

The injection molding method for metal powder is so called as "metal injection molding (MIM)". The MIM method is, in general, a molding method that after metal powder and resin binder are mixed, the mixture is injected to a mold to form, and then the molded body which is degreased to remove the binder is sintered to be a finished product. After being sintered, a post processing is performed according to requirement. The MIM method has the following advantages. Namely, (1) small parts with a complicated shape can be formed by near net shape, (2) parts having the same shape are capable of mass production with transferring the mold shape, (3) by confirming the contraction rate during molding and the contraction rate during degreasing and sintering, etc., parts with high dimensional accuracy can be manufactured, (4) due to transferring the mold shape, the same surface accuracy (surface roughness and the like) as the finishing accuracy of the mold can be secured, (5) the near net shape for material hard to be processed, such as stainless steel, is possible.

To form the housing by the MIM method contributes to reduce the manufacturing cost. In addition to the housing or in place of the housing, the axis member or the thrust member may be also formed by the MIM method. To form such a part having a radial surface that constitutes the radial bearing portion or a thrust surface that constitutes the thrust bearing portion as the axis member or the thrust member by the MIM method contributes to accurately finish the surface roughness, etc., of the radial surface or the thrust surface, so that the processing cost can be reduced. Moreover, by processing the shape of the dynamic pressure generating grooves on the desired portion of a mold, the dynamic pressure generating grooves can be simultaneously formed (transferred) on the radial surface or the thrust surface during molding, and therefore, no further process for the dynamic pressure generating grooves is required in the subsequent steps so that the processing cost can be reduced.

In addition, as a means for fixing the bearing sleeve to the housing, adhesion by epoxy adhesive and the like, press fitting, laser beam welding (irradiating the laser beam to the fixing portion of the bearing sleeve from the outer diameter side of the housing, or directly irradiating the laser beam to the fixing portion of the bearing sleeve), high frequency pulse joining, or caulking, etc. may be employed.

Furthermore, as a means for fixing the thrust member to the housing, press fitting and adhesion, laser beam welding (irradiating the laser beam to the fixing portion of the thrust member from the outer diameter side of the housing, or directly irradiating the laser beam to the fixing portion of the thrust member), high frequency pulse joining, or caulking, etc. may be employed.

In the above structure, a sealing means for sealing the internal space of the housing may be disposed at a side of the other end face of the bearing sleeve. The sealing means may be constituted with fixing a sealing member to the housing. In this case, as a fixing means for the sealing member, adhesion by epoxy adhesive and the like, press fitting, laser beam welding (irradiating the laser beam to the fixing portion of the sealing member from the outer diameter side of the housing, or directly irradiating the laser beam to the fixing portion of the sealing member), high frequency pulse joining, or caulking, etc. may be employed. Alternatively, the sealing means can be integrally formed to the housing. Thereby, the number of parts can be reduced so that the manufacturing cost can be further reduced. The housing having the sealing means integrally may be formed, for example, by the MIM method.

In the above structure, the positioning of the bearing sleeve with respect to the housing may be performed by making the other end face of the bearing sleeve contact with the sealing means. Thereby, the positioning process of the bearing sleeve is made easy so that the assembling process can be simplified.

In the above structure, although the shape of the inner circumference of the housing is not particularly limited, a straight shape in the axial direction may be employed. In this manner, the shape of the housing can be simplified so that the processing cost can be reduced.

Alternatively, the positioning of the bearing sleeve with respect to the housing may be performed by forming a step portion on the inner circumference of the housing to make one end of the bearing sleeve contact with the step portion. In this way, the positioning process of the bearing sleeve is made easy so that the assembling process can be simplified.

In the above structure, the bearing sleeve may be made of a sintered metal. In addition, the housing and the bearing sleeve may be integrally formed with each other. In this manner, the number of parts is reduced so that the manufacturing cost can be further reduced. The housing having the bearing sleeve integrally may be formed, for example, by the MIM method. In this case, by processing the shape of the dynamic pressure generating grooves on the desired portion of a mold, the dynamic pressure generating grooves can be simultaneously formed (transferred) on the desired portion of the housing during molding.

In order to achieve the foregoing objects, the present invention further provides a method for producing a dynamic bearing device. The dynamic bearing device comprises a housing, a bearing sleeve fixed to an inner circumference of the housing, an axis member having an axis portion and a flange portion, a thrust member fixed to the housing, a radial bearing portion, arranged between an inner circumferential surface of the bearing sleeve and an outer circumferential surface of the axis portion, for supporting the axis portion in a non-contact manner in the radial direction under a dynamic action of lubrication oil generated in a radial bearing gap, a first thrust bearing portion, arranged between one end face of the bearing sleeve and one end face of the flange portion opposite thereto, for supporting the flange portion in a non-contact manner in the thrust direction under a dynamic action of lubrication oil generated in a thrust bearing gap, and a second thrust bearing portion, arranged between an end face of the thrust member and the other end face of the flange portion opposite thereto, for supporting the flange portion in a non-contact manner in the thrust direction under a dynamic action of lubrication oil generated in a thrust bearing gap. And the method comprises the steps of positioning the bearing sleeve at a predetermined position on the housing, and setting the position of the thrust member with respect to the housing with using the one end face of the bearing sleeve as a reference, thereby forming the thrust bearing gap for the first thrust bearing portion and the second thrust bearing portion with a predetermined dimension. According to the structure, with using the one end face of the bearing sleeve positioned at the predetermined position on the housing as a reference, the position of the thrust member with respect to the housing is set, and therefore, the thrust bearing gaps are not affected by the assembling accuracy of the bearing sleeve to the housing or the surface accuracy of the thrust surfaces. Thus, the thrust bearing gaps can be more accurately and easily formed, and in this manner, the bearing property can be further improved. Moreover, it is not necessary to process parts with higher accuracy or to perform more complicated assembling process than necessary in order to accurately form the thrust bearing gaps, so that the manufacturing cost for the dynamic bearing device can be reduced.

In the above structure, the positioning of the bearing sleeve may be performed by making the other end face of the bearing sleeve contact with the sealing means that is integrally or separately formed to the housing, or alternatively, performed by making one end of the bearing sleeve contact with a step portion that is formed on the housing, or performed by forming the housing and the bearing sleeve integrally with each other. According to these structures, the process for positioning the bearing sleeve can be easily made so that the assembling process can be simplified.

In the above structure, the process to form the thrust bearing gap with a predetermined dimension may comprise the steps of making the one end face of the bearing sleeve contact with the one end face of the flange portion and also making the end face of the thrust member contact with the other end face of the flange portion, and making the thrust member relatively move in the axial direction with respect to the housing and the bearing sleeve with an amount that is equivalent to a sum of the thrust bearing gaps of the first thrust bearing portion and the second bearing portion. In this way, not only does the assembling accuracy of the bearing sleeve to the housing or the surface accuracy of the thrust surfaces not affect the thrust bearing gaps, but also the dimensional accuracy of the flange portion in the axial direction does not affect the thrust bearing gaps, therefore, the thrust bearing gaps can be more accurately formed.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
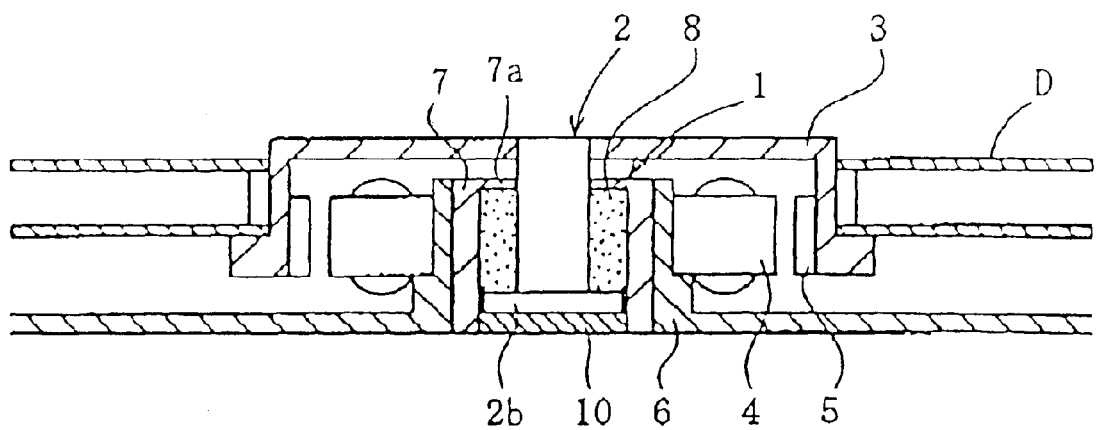
FIG. 1 is a cross-sectional view showing a spindle motor with a dynamic bearing device according to an embodiment of the present invention.

The preferred embodiment according to the present invention is described in detail accompanying with the following attached drawings. FIG. 1 shows an exemplary structure of a spindle motor for information equipment where a dynamic bearing device (a fluid dynamic bearing device) 1 of the embodiment is installed therein. The spindle motor is used in a disk driving device, such as a HDD (hard disk drive), and comprises the dynamic bearing device 1 for rotatably supporting an axis member 2 in a non-contact manner, a disk hub 3 mounted on the axis member 2, and a motor stator 4 and a motor rotor 5 opposed to each other, for example, through a radial gap. The stator 4 is attached to the outer circumference of a casing 6 and the rotor 5 is attached to the inner circumference of the disk hub 3. The housing 7 of the dynamic bearing device 1 is installed in the inner circumference of the casing 6. One or a plurality of disks D, such as a magnetic disk, is held on the disk hub 3. When the stator 4 is turned on electricity, the rotor 5 is rotated due to a magnetizing force generated between the stator 4 and the rotor 5. In this way, the disk hub 3 and the axis member 2 rotate together.

Figure 2:
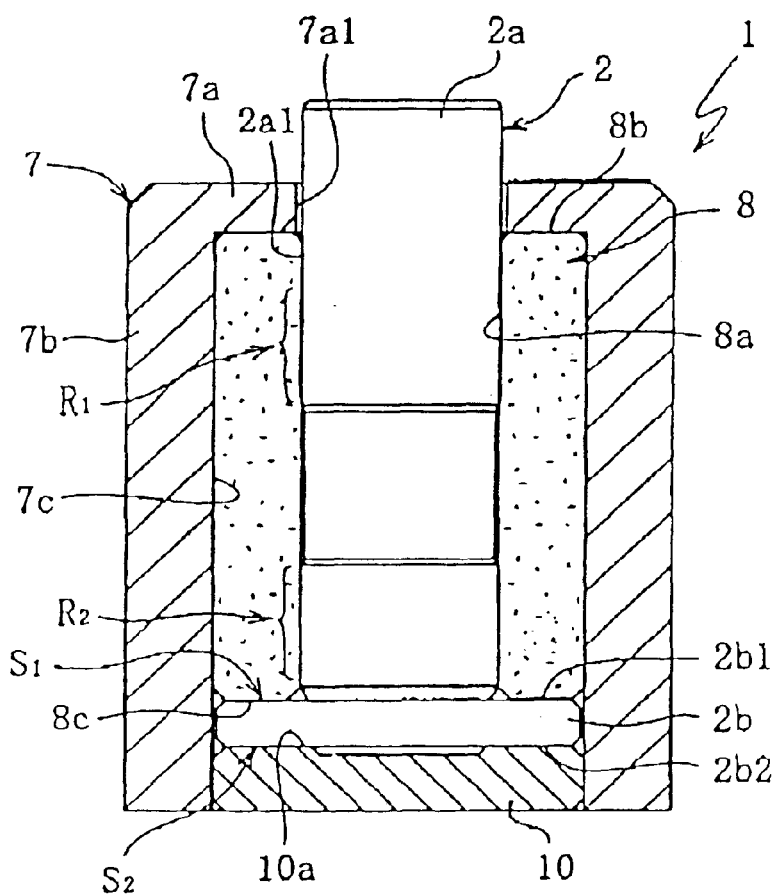
FIG. 2 is a cross-sectional view of a dynamic bearing device according to an embodiment of the present invention.

FIG. 2 shows the dynamic bearing device 1. The dynamic bearing device 1 comprises the housing 7, the axis member 2, a bearing sleeve 8 and a thrust member 10 both of which are fixed to the housing 7.

A first radial bearing portion R1 and a second radial bearing portion R2 are disposed between an inner circumferential surface 8a of the bearing sleeve 8 and an outer circumferential surface 2a1 of an axis portion 2a of the axis member 2, apart from each other in the axial direction. In addition, a first thrust bearing portion S1 is disposed between a lower side end face 8c of the bearing sleeve 8 and an upper side end face 2b1 of a flange portion 2b of the axis member 2, and a second thrust bearing portion S2 is disposed between an end face 10a of the thrust member 10 and a lower side end face 2b2 of the flange portion 2b. For convenience, the side of the thrust member 10 is referred to a lower side and the side opposite to the thrust member 10 is referred to an upper side.

The housing 7, for example, is formed in a reverse cup shape by the MIM (metal injection molding) method from metal powder such as magnesium, and comprises a cylindrical side portion 7b and an annular sealing portion 7a that extends integrally from the upper end of the side portion 7b to the inner diameter side. The inner circumferential surface 7a1 of the sealing portion 7a is opposite to the outer circumferential surface 2a1 of the axis portion 2a through a predetermined sealing space. In addition, the inner circumferential surface 7c of the side portion 7b is a straight shape in the axial direction.

The axis member 2, for example, is formed by metal material, such as stainless steel, and comprises the axis portion 2a and the flange portion 2b that is integrally or separately formed at the lower end of the axis portion 2a.

The bearing sleeve 8, for example, is formed in a cylindrical shape with a porous body made of sintered metal, especially a porous body made of sintered metal with a main component of copper. The bearing sleeve 8 is fixed at a predetermined position of the inner circumferential surface 7c of the housing 7 with a proper means such as press fitting, adhesion, laser beam welding, or high frequency pulse jointing. An upper side end face 8b of the bearing sleeve 8 is in contact with the sealing portion 7a of the housing 7.

Figure 3A:
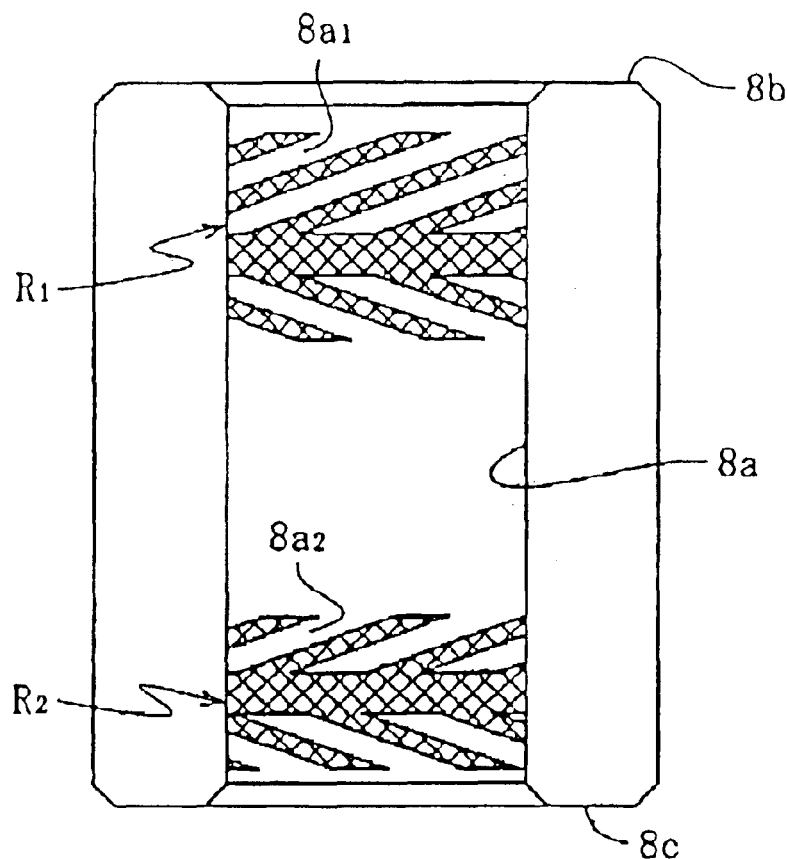
FIG. 3a is a cross-sectional view of a bearing sleeve.

Two (upper and lower) regions constituting radial bearing surfaces of the first bearing portion R1 and the second radial bearing portion R2 are arranged on the inner circumferential surface 8a of the bearing sleeve 8 that is made of sintered metal, apart from each other in the axial direction. As shown in FIG. 3a, herringbone-shaped dynamic pressure generating grooves 8a1, 8a2 are respectively formed on the two regions. In addition, the shape of the dynamic pressure generating grooves may be a spiral shape or an axial-direction groove shape.

Figure 3B:
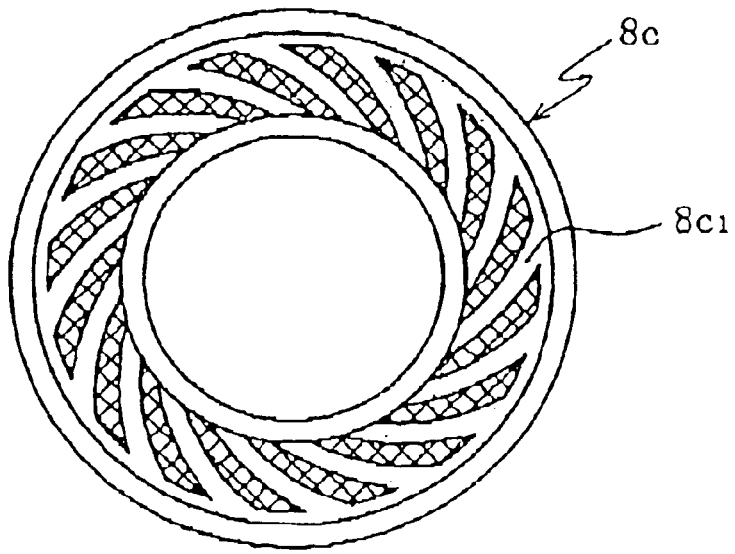
FIG. 3b shows the lower-side end face.

As shown in FIG. 3b, for example, spiral-shaped dynamic pressure generating grooves 8c1 are formed on the lower side end face 8c of the bearing sleeve 8, which constitutes a thrust bearing surface of the first thrust bearing portion S1. In addition, the shape of the dynamic pressure generating grooves may be a herringbone shape or a radiation groove shape.

Figure 4A:
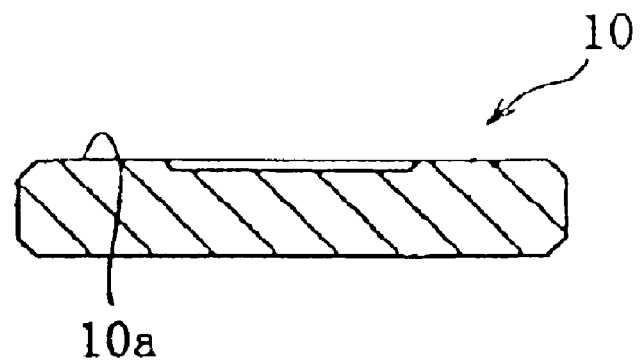
FIG. 4a is a cross-sectional view of a thrust member.
Figure 4B:
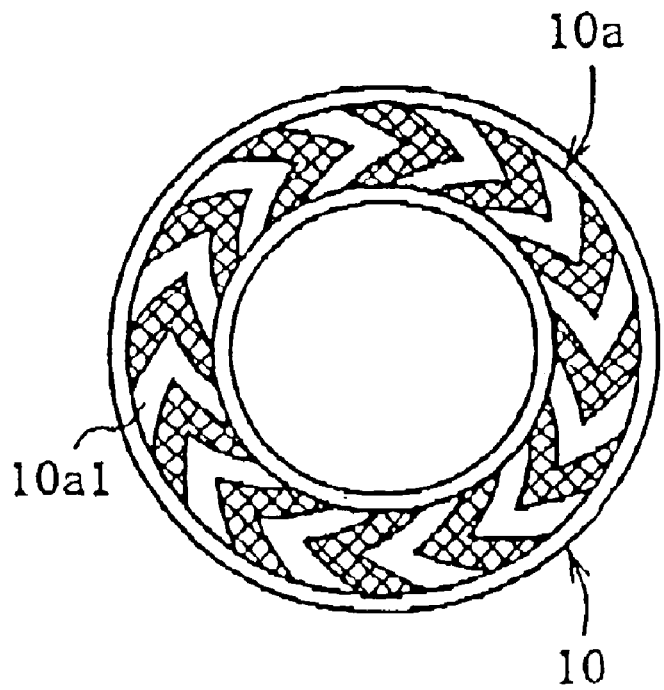
FIG. 4b is a plane view.

Referring to FIGS. 4a and 4b, the thrust member 10, for example, is formed in a circular disk shape by the MIM method from metal powder such as magnesium (Mg). The thrust member 10 is fixed on the lower end of the inner circumferential surface 7c of the housing 7 with a proper means such as press fitting and adhesion, laser beam welding, or high frequency pulse jointing. As shown in FIG. 4b, herringbone-shaped dynamic pressure generating grooves 10a1 are formed on the end face 10a of the thrust member 10, which constitutes a thrust bearing surface of the second thrust bearing portion S2. When the thrust member 10 is formed by the MIN method, the dynamic pressure generating grooves can be simultaneously formed (transferred by a mold) during molding. In addition, the shape of the dynamic pressure generating grooves may be a spiral shape or a radiation groove shape.

The axis portion 2a of the axis member 2 is inserted into the inner circumferential surface 8a of the bearing sleeve 8. The flange portion 2b is accommodated in a space between the lower side end face 8c of the bearing sleeve 8 and the end face 10a of the thrust member 10. In addition, lubrication oil is filled in the internal space of the housing 7 that is sealed by the sealing portion 7a.

When the axis member 2 rotates, the regions (two regions, upper and lower) of the inner circumferential surface 8a of the bearing sleeve 8, which constitute the radial bearing surfaces, are respectively opposite to the outer circumferential surface 2a1 of the axis portion 2a through the radial bearing gap. In addition, the region of the lower side end face 8c of the bearing sleeve 8, which constitutes the thrust bearing surface, is opposite to the upper side end face 2b1 of the flange portion 2b through the thrust bearing gap, and the region of the end face 10a of the thrust member 10, which constitutes the thrust bearing surface, is opposite to the lower side end face 2b2 of the flange portion 2b through the thrust bearing gap. Accompanying with the rotation of the axis member 2, a hydrodynamic pressure of the lubrication oil is generated in the radial bearing gaps respectively. Due to oil film of the lubrication oil formed in the radial bearing gaps, the axis portion 2a of the axis member 2 is rotatably supported in a non-contact manner in the radial direction. Thus, the first radial bearing portion R1 and the second radial bearing portion R2 that rotatably support the axis member 2 in a non-contact manner in the radial direction are constituted. At the same time, a hydrodynamic pressure of the lubrication oil is generated in the thrust bearing gaps respectively. Due to oil film of the lubrication oil formed in the thrust bearing gaps, the flange portion 2b of the axis member 2 is rotatably supported in a non-contact manner in the both thrust directions. Thus, the first thrust bearing portion S1 and the second thrust bearing portion S2 that rotatably support the axis member 2 in a non-contact manner in the thrust direction are constituted.

The dynamic bearing device 1 of the embodiment, for example, is assembled according to the processes shown in FIGS. 5~8. In FIGS. 5~8, the up and down sides are opposite to those in FIG. 2.

Figure 5:
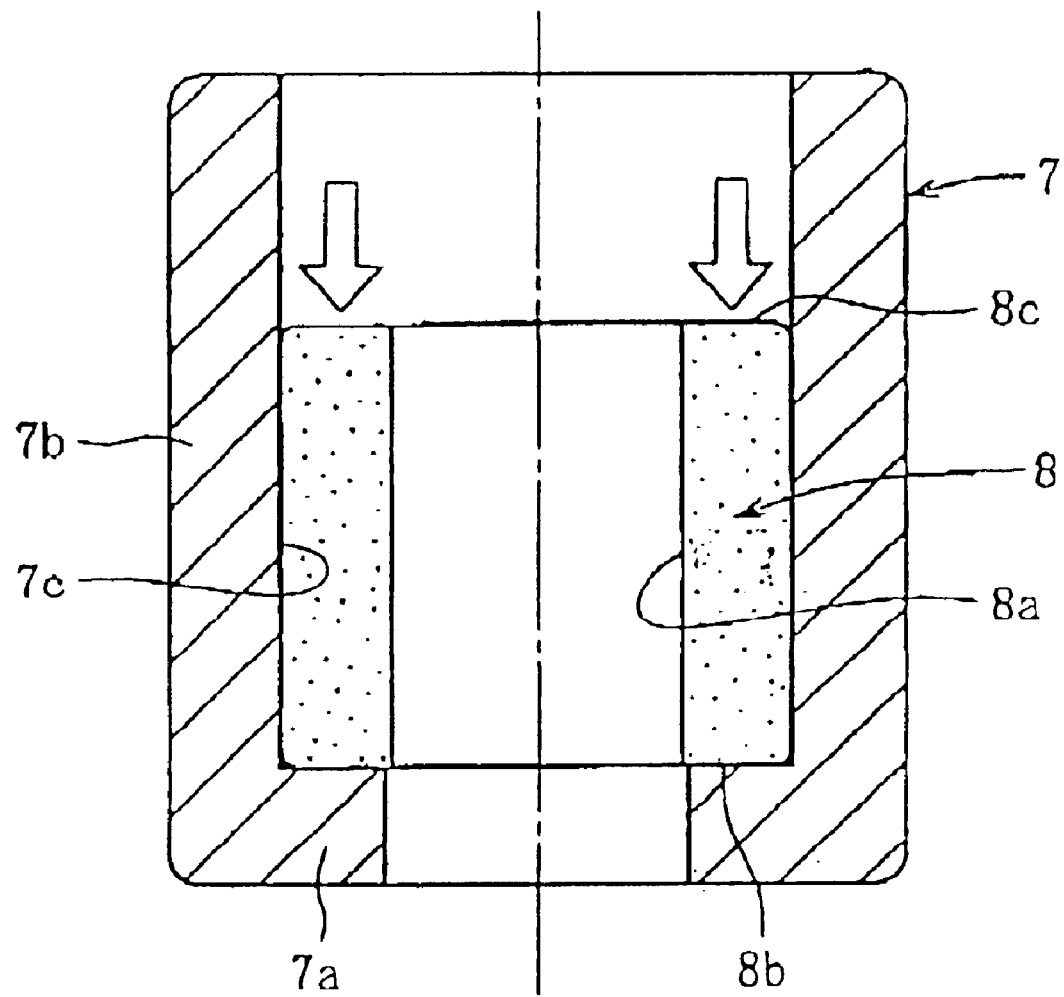
FIG. 5 is a cross-sectional view showing an assembling process of the dynamic bearing device in FIG. 2.

First, as shown in FIG. 5, the bearing sleeve 8 is inserted (or may be press fitted) into the inner circumferential surface 7c of the housing 7 such that the upper side end face 8b thereof is in contact with the sealing portion 7a. In this way, the position of the bearing sleeve 8 in the axial direction with respect to the housing 7 is determined. Under the status, the bearing sleeve 8 is fixed to the housing 7.

Figure 6:
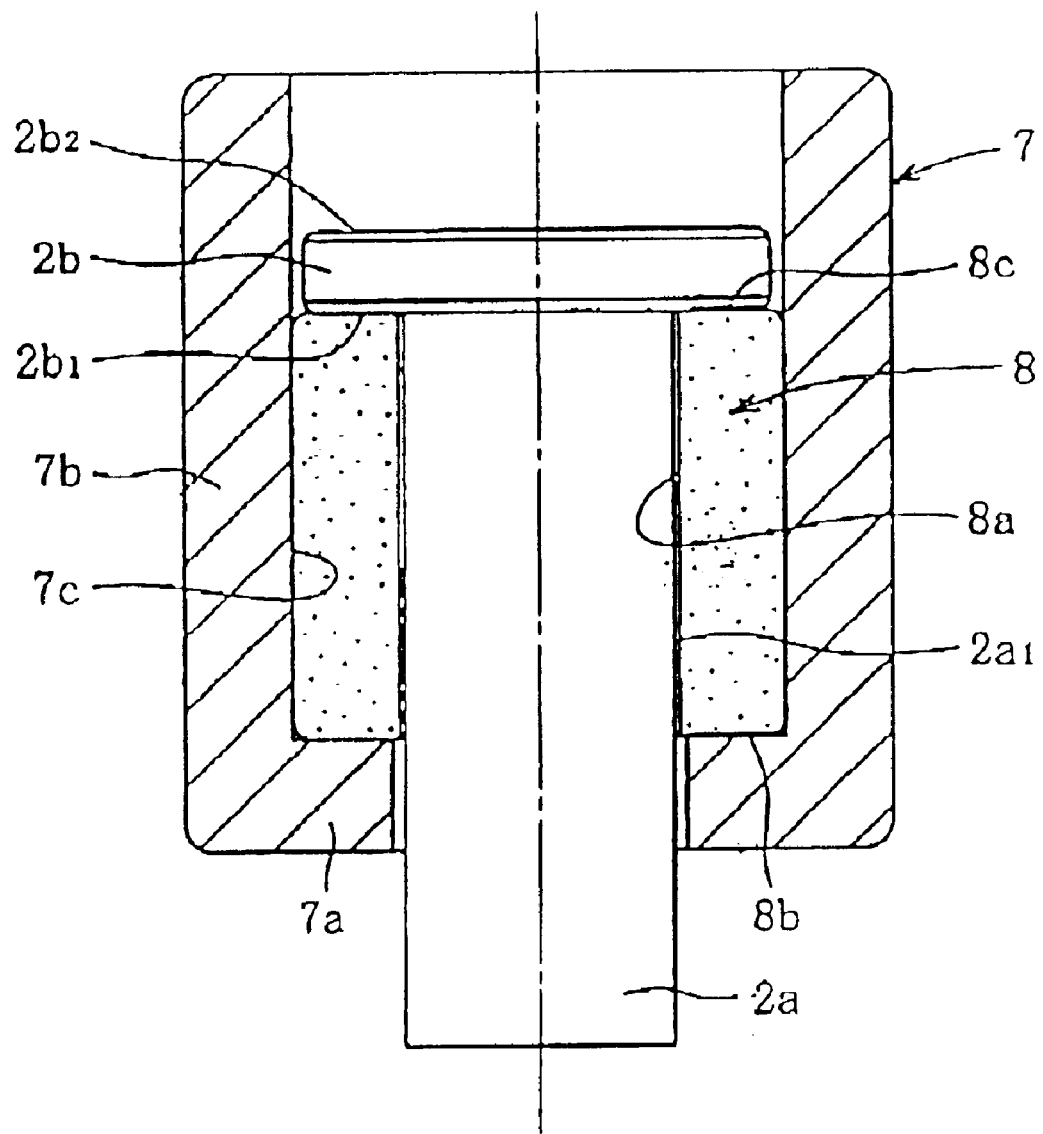
FIG. 6 is a cross-sectional view showing an assembling process of the dynamic bearing device in FIG. 2.

Next, referring to FIG. 6, the axis member 2 is installed in the bearing sleeve 8. The dimension of the inner diameter of the bearing sleeve 8 may be measured in a condition that the bearing sleeve 8 is fixed to the housing 7, and then the dimensional matching of the dimension of the inner diameter of the bearing sleeve 8 with the dimension of the outer diameter of the axis portion 2a, which is previously measured, may be performed. Thereby, the radial bearing gap can be accurately set.

Figure 7:
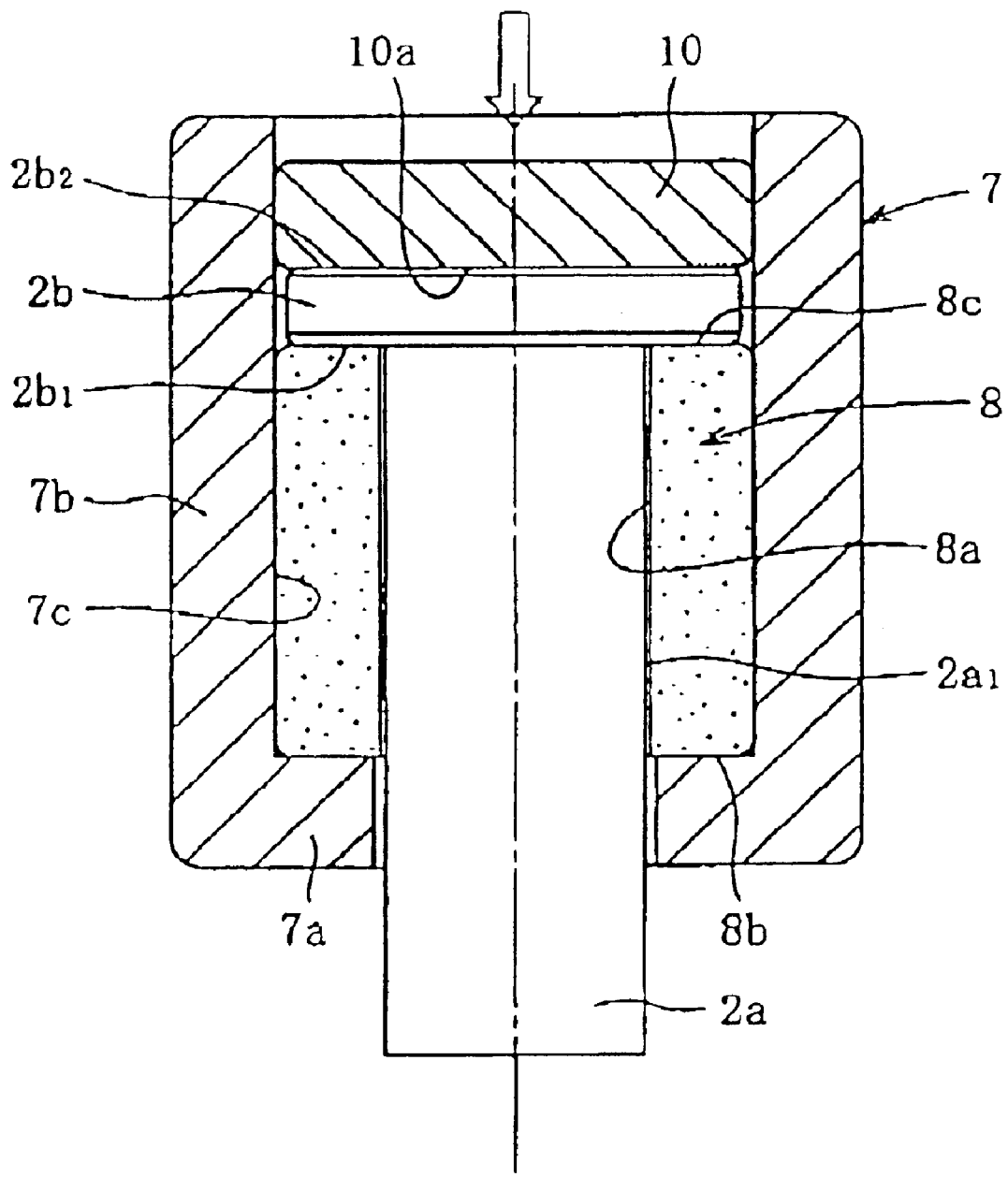
FIG. 7 is a cross-sectional view showing an assembling process of the dynamic bearing device in FIG. 2.

Next, referring to FIG. 7, the thrust member 10 is inserted (or may be press fitted) into the inner circumferential surface 7c of the housing 7, and then is pushed to move toward the side of the bearing sleeve 8. The end face 10a of the thrust member 10 is thus in contact with the lower side end face 2b2 of the flange portion 2b, and at the same time, the upper side end face 2b1 of the flange portion 2b is in contact with the lower side end face 8c of the bearing sleeve 8. This stated is that the thrust bearing gap is zero, i.e., each of the thrust bearing gaps of the first thrust bearing portion S1 and the second thrust bearing portion S2 is respectively zero. In addition, the bearing sleeve 8 may be fixed to the housing 7 in this stage.

Figure 8:
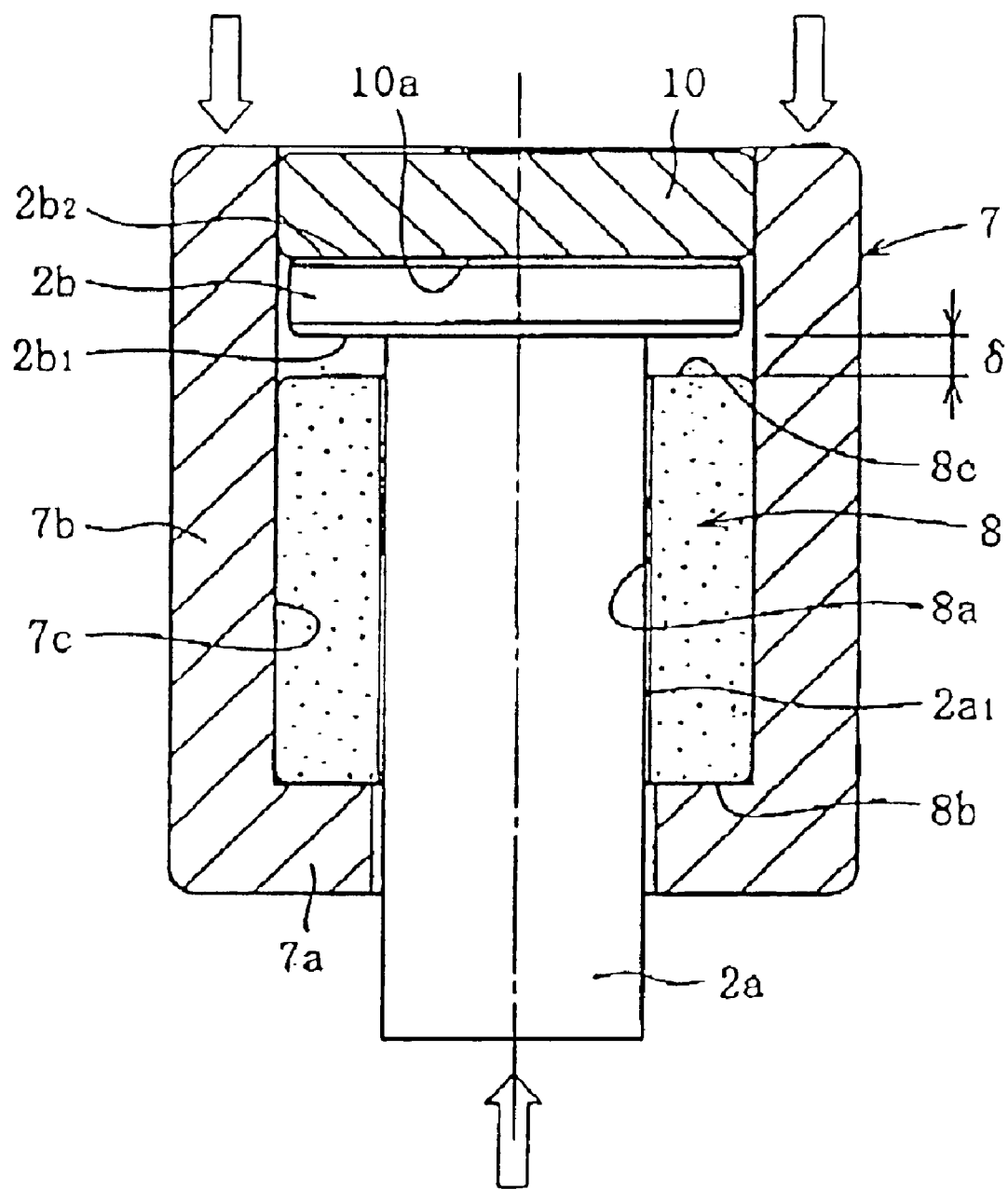
FIG. 8 is a cross-sectional view showing an assembling process of the dynamic bearing device in FIG. 2.

Next, referring to FIG. 8, the thrust member 10 is made to relatively move with respect to the housing 7 and the bearing sleeve 8 in the axial direction together with the axis member 2, with a dimension δ(δ=δ1+δ2) that is equivalent to the sum of the thrust bearing gap (size is δ1) of the first thrust bearing portion S1 and the thrust bearing gap (size is δ2) of the second thrust bearing portion S2. Then, as the thrust member 10 is fixed to the housing 7 at that position, the predetermined thrust bearing gap δ(δ=δ1+δ2) is formed.

According to the aforementioned method, the constituting parts of the dynamic bearing device 1 are actually assembled to once achieve the state of the thrust bearing gap (gaps) being zero, and then, from that state, the thrust member 10, the housing 7 and the bearing sleeve 8 are made to relatively move in the axial direction with the predetermined amount, to form the thrust bearing gap. Therefore, with only controlling the amount of the axial relative movement δ(δ=δ1+δ2), the thrust bearing gap can be accurately formed without being affected by the assembling accuracy of the bearing sleeve 8 with respect to the housing 7 or the surface accuracy of the thrust surfaces (8c, 10a, 2b1, 2b2), the axial dimension accuracy of the flange portion 2b, etc.

Figure 9:
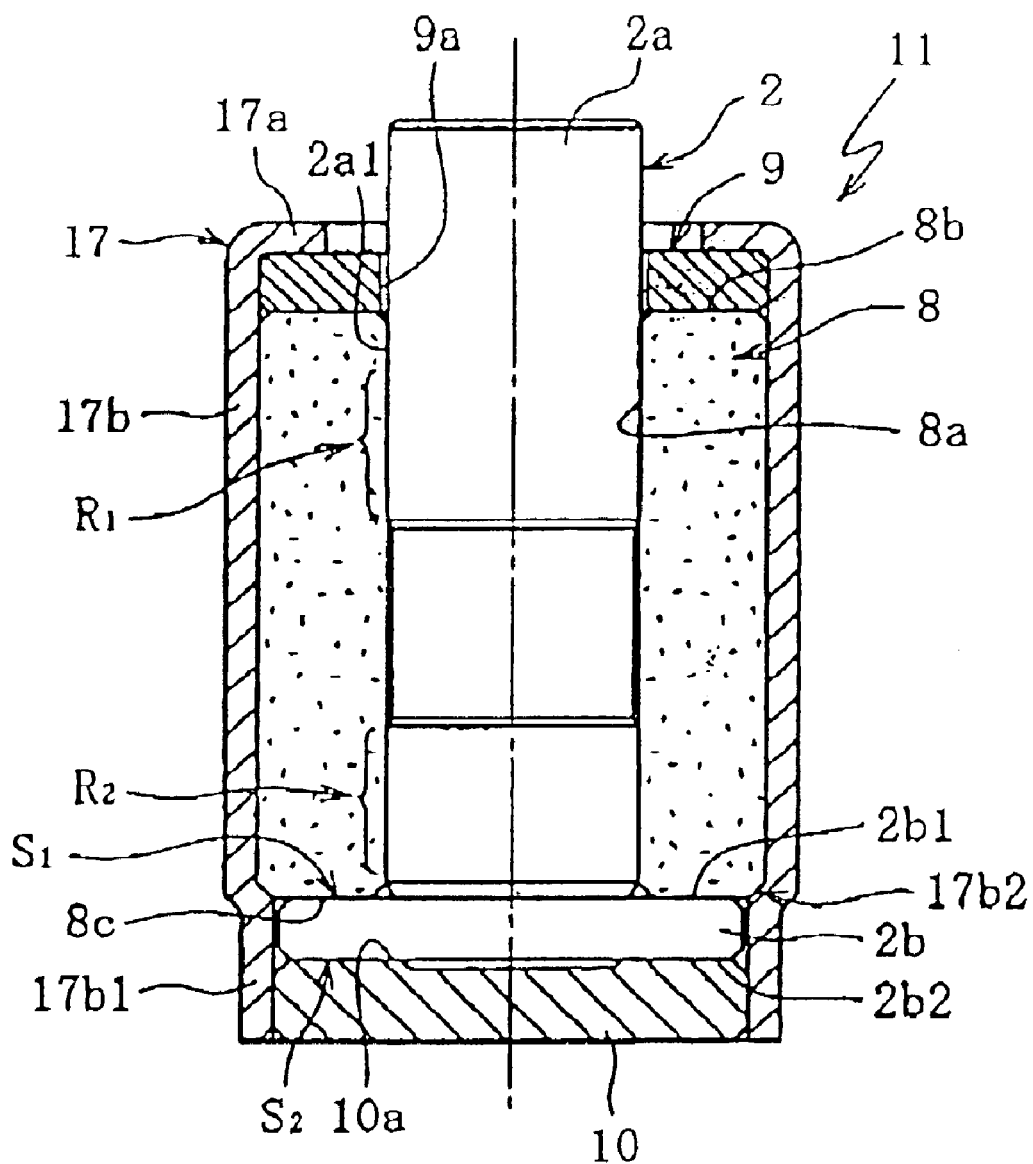
FIG. 9 is a cross-sectional view of a dynamic bearing device according to another embodiment of the present invention.

FIG. 9 shows a dynamic bearing device 11 according to another embodiment of the invention. The dynamic bearing device 11 comprises a thin housing 17, a bearing sleeve 8 and a thrust member 10 both of which are fixed to the housing 17, an axis member 2, and a sealing member 9. In addition, parts and portions that are substantially the same as those of the dynamic bearing device 1 shown in FIG. 2 are labeled with the same reference number and symbol, and their corresponding descriptions are omitted.

The housing 17, for example, is formed by pressing (drawing work) from a metal plate (plate material or pipe material), and comprises a cylindrical side portion 17b, an annular engaging portion 17a that extends integrally from the upper end of the side portion 17b to the inner diameter side. The inner diameter of the lower side portion 17b1 of the side portion 17b is formed to have a diameter smaller than other portions, and the boundary therebetween forms a step portion 17b2. In addition, in this embodiment, the lower side portion 17b1 of the side portion 17b is drawn to be smaller in diameter than other portions to form the step portion 17b2. However, in order to form the step portion 17b2, for example, the lower side portion 17b1 and other portions of the side portion 17b may be different in thickness from each other, or a portion corresponding to the aforementioned boundary may be locally bended to the inner diameter side. In addition, the step portion 17b2 may be formed to surround the entire circumference, or may be partially formed at a plurality of locations in the circumferential direction.

The sealing member 9 is fixed to the inner circumference of the upper end portion of the side portion 17b of the housing 17, and sandwiched by the engaging portion 17a of the housing 17 and the upper side end face 8b of the bearing sleeve 8 in the axial direction. The inner circumferential surface 9a of the sealing member 9 is opposite to the outer circumferential surface 2a1 of the axis portion 2a through a predetermined sealing space.

Figure 10:
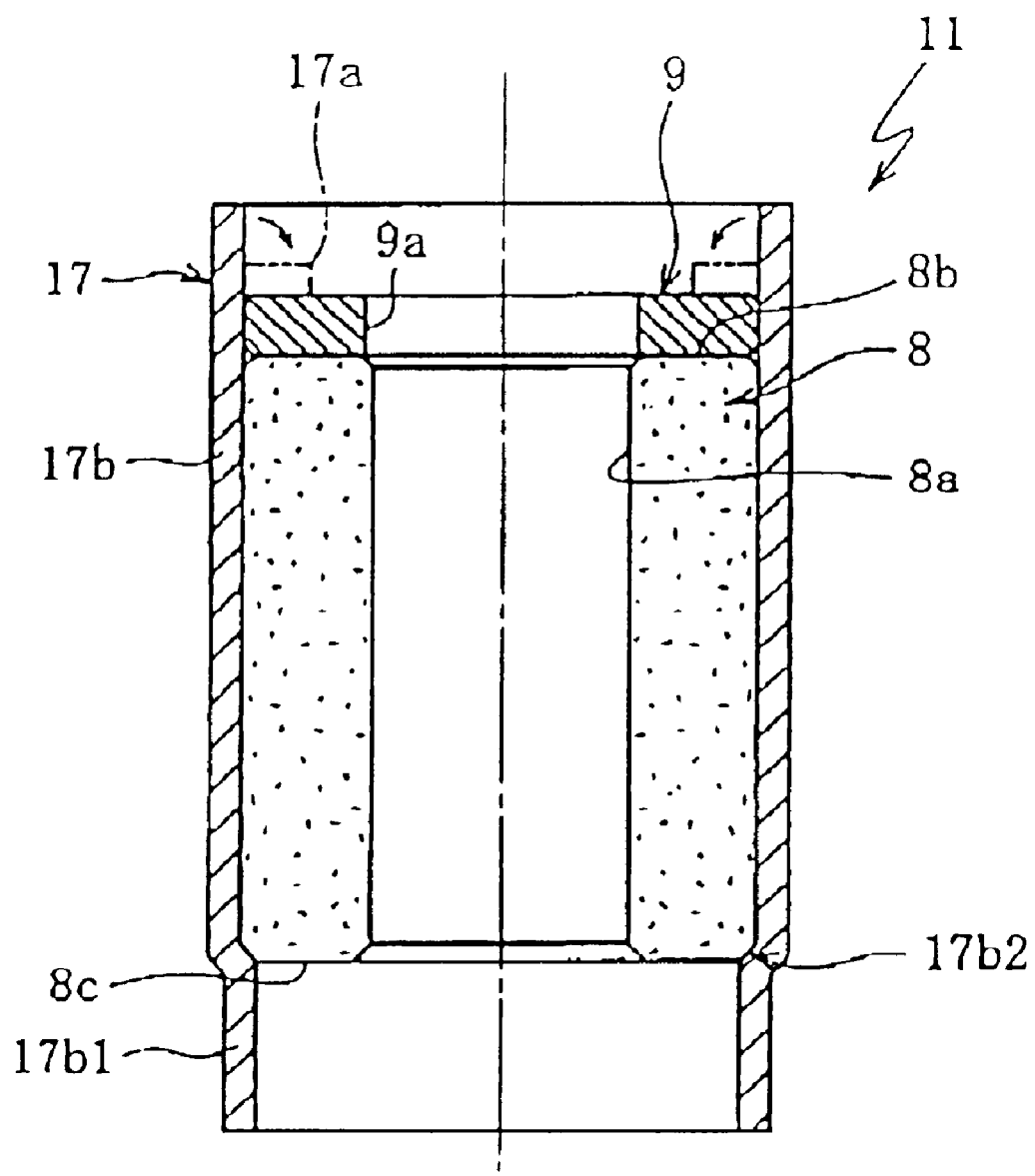
FIG. 10 is a cross-sectional view showing an assembling process of the dynamic bearing device in FIG. 9.
Figure 11:
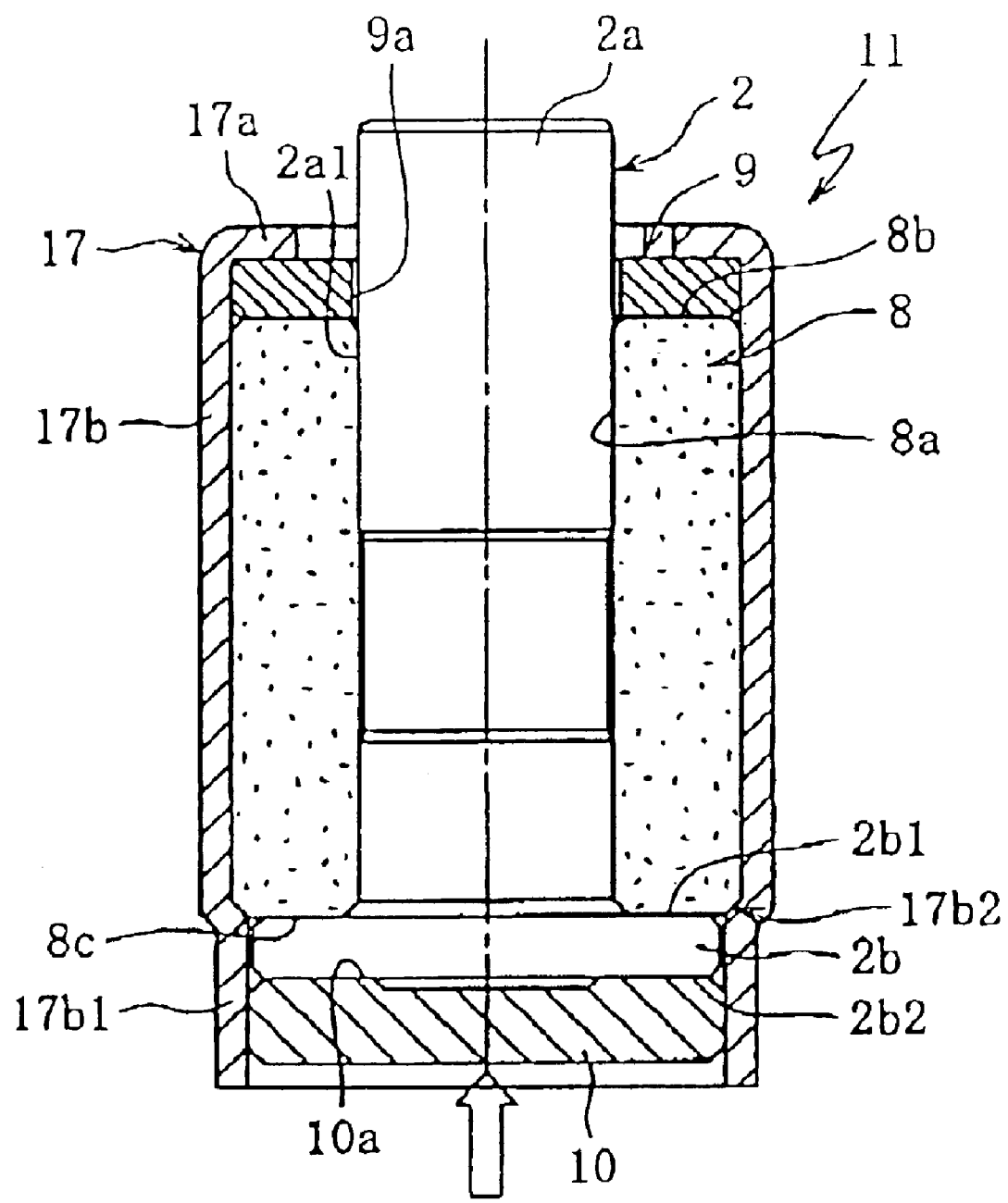
FIG. 11 is a cross-sectional view showing an assembling process of the dynamic bearing device in FIG. 9.
Figure 12:
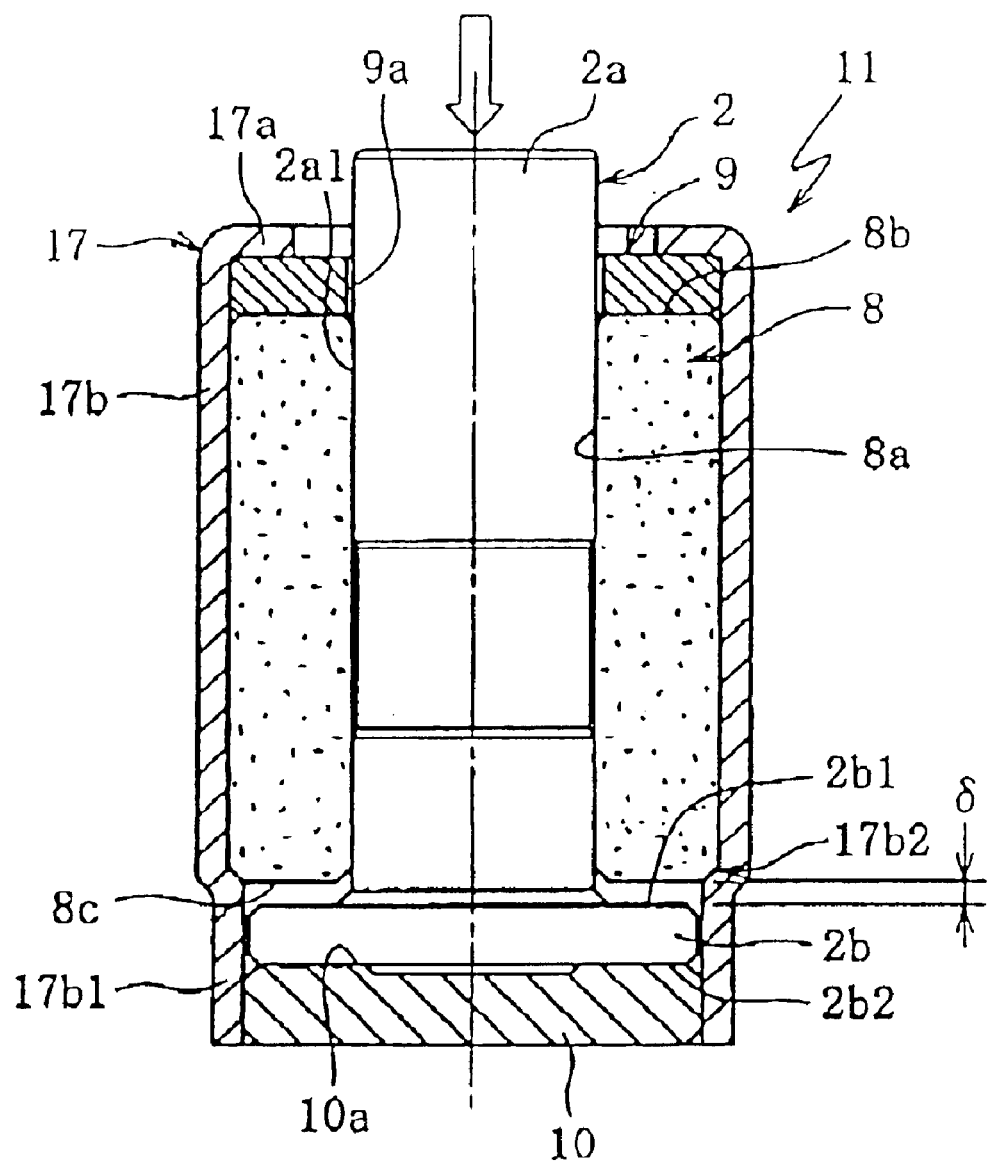
FIG. 12 is a cross-sectional view showing an assembling process of the dynamic bearing device in FIG. 9.

The dynamic bearing device 11 of this embodiment, for example, is assembled according to the processes shown in FIGS. 10~12.

First, as shown in FIG. 10, the bearing sleeve 8 is inserted (or may be press fitted) into the inner circumference of the side portion 17b of the housing 17, and the lower side end portion (the end face 8c side) is made to be in contact with the step portion 17b2 of the side portion 17b. Then, the sealing member 9 is inserted (or may be press fitted) into the inner circumference of the side portion 17b of the housing 17, so as to be in contact with the upper side end face 8b of the bearing sleeve 8. In this way, the position of the bearing sleeve 8 in the axial direction with respect to the housing 17 is determined. In this state, the bearing sleeve 8 and the sealing member 9 are fixed to the housing 17. Afterwards, the upper side end portion of the side portion 17b of the housing 17 is bent towards the inner diameter side to deform, so as to form the engaging portion 17a and contact with the sealing member 9. In addition, as means for fixing one or both of the bearing sleeve 8 and the sealing member 9, the side portion 17b of the housing 17 may be caulked. In this case, a recessed portion may be arranged at the outer circumference of one or both of the bearing sleeve 8 and the sealing member 9, so as to caulk the side portion 17b to the recessed portion. Alternatively, by press fitting one or both of the bearing sleeve 8 and the sealing member 9 into the inner circumference of the side portion 17b, the fixing process of these parts to the housing 17 can be omitted.

Next, referring to FIG. 11, the axis member 2 is installed into the bearing sleeve 8. Then, the thrust member 10 is inserted (or may be press fitted) into the inner circumference of the lower side end portion 17b1 of the side portion 17b, and then is pushed to move toward the side of the bearing sleeve 8. The end face 10a of the thrust member 10 is thus in contact with the lower side end face 2b2 of the flange portion 2b, and at the same time, the upper side end face 2b1 of the flange portion 2b is in contact with the lower side end face 8c of the bearing sleeve 8. This stated is that the thrust bearing gap is zero, i.e., each of the thrust bearing gaps of the first thrust bearing portion S1 and the second thrust bearing portion S2 is respectively zero.

Referring to FIG. 12, the thrust member 10 is made to relatively move with respect to the housing 17 and the bearing sleeve 8 in the axial direction together with the axis member 2, with a dimension δ(δ=δ1+δ2) that is equivalent to the sum of the thrust bearing gap (size is δ1) of the first thrust bearing portion S1 and the thrust bearing gap (size is δ2) of the second thrust bearing portion S2. Then, as the thrust member 10 is fixed to the housing 7 at that position, the predetermined thrust bearing gap δ(δ=δ1+δ2) is formed.

Figure 13:
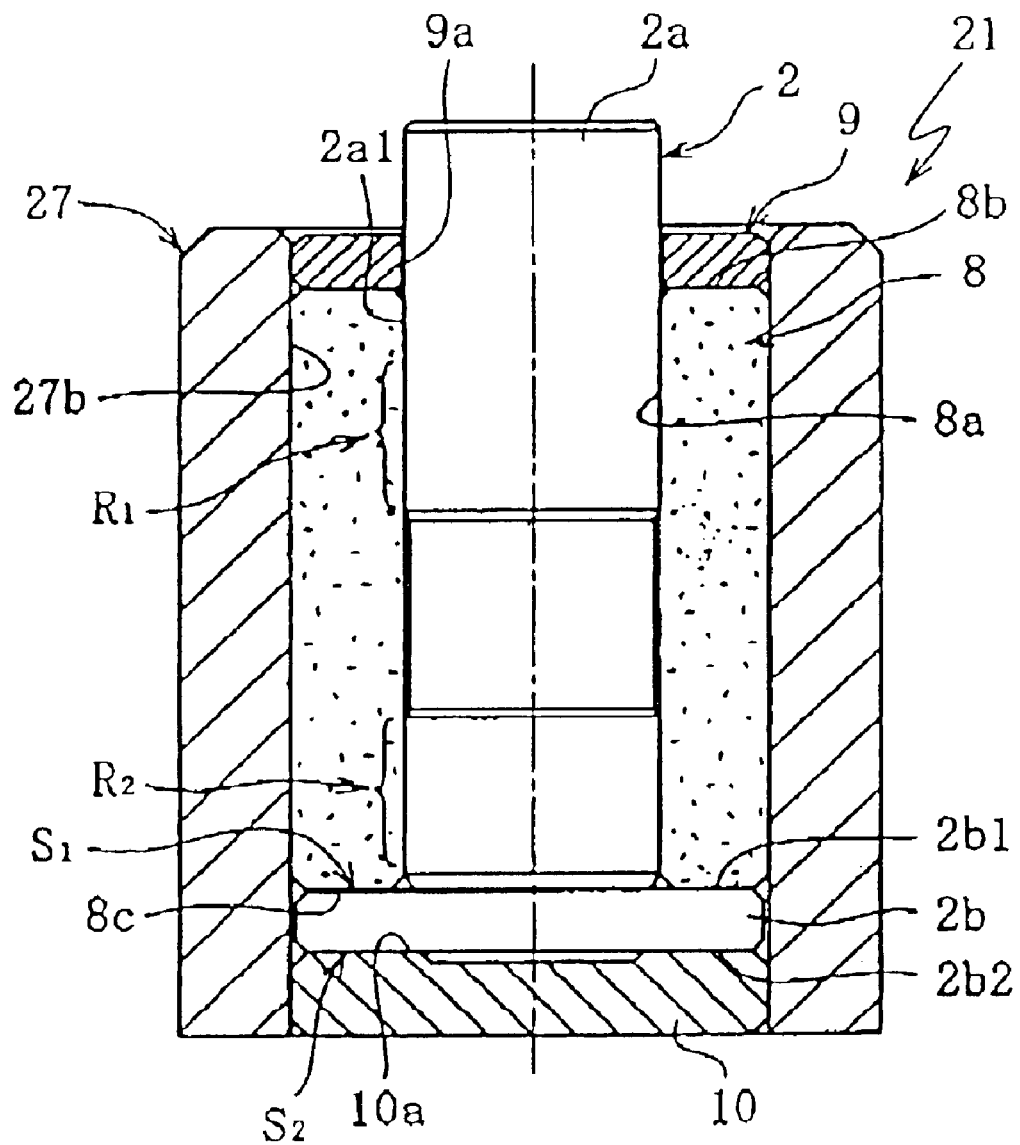
FIG. 13 is a cross-sectional view of a dynamic bearing device according to another embodiment of the present invention.

FIG. 13 shows a dynamic bearing device 21 according to another embodiment of the invention. The dynamic bearing device 21 comprises a housing 27, a bearing sleeve 8 and a thrust member 10 both of which are fixed to the housing 27, an axis member 2, and a sealing portion 9. In addition, parts and locations that are substantially the same as those of the dynamic bearing device 1 shown in FIG. 2 are labeled with the same reference number and symbol, and their corresponding descriptions are omitted.

The housing 27, for example, is formed in a cylindrical shape by the MIM method from metal powder such as magnesium. The inner circumferential surface 27b thereof is a straight shape in the axial direction.

The sealing member 9 is fixed to the inner circumference of the upper end portion of the housing 27. The inner circumferential surface 9a of the sealing member 9 is opposite to the outer circumferential surface 2a1 of the axis portion 2a through a predetermined sealing space.

In the dynamic bearing device 21 of this embodiment, the sealing member 9 is first fixed to the housing 27, and then assembled by the same processes shown in FIGS. 5~8.

Figure 14:
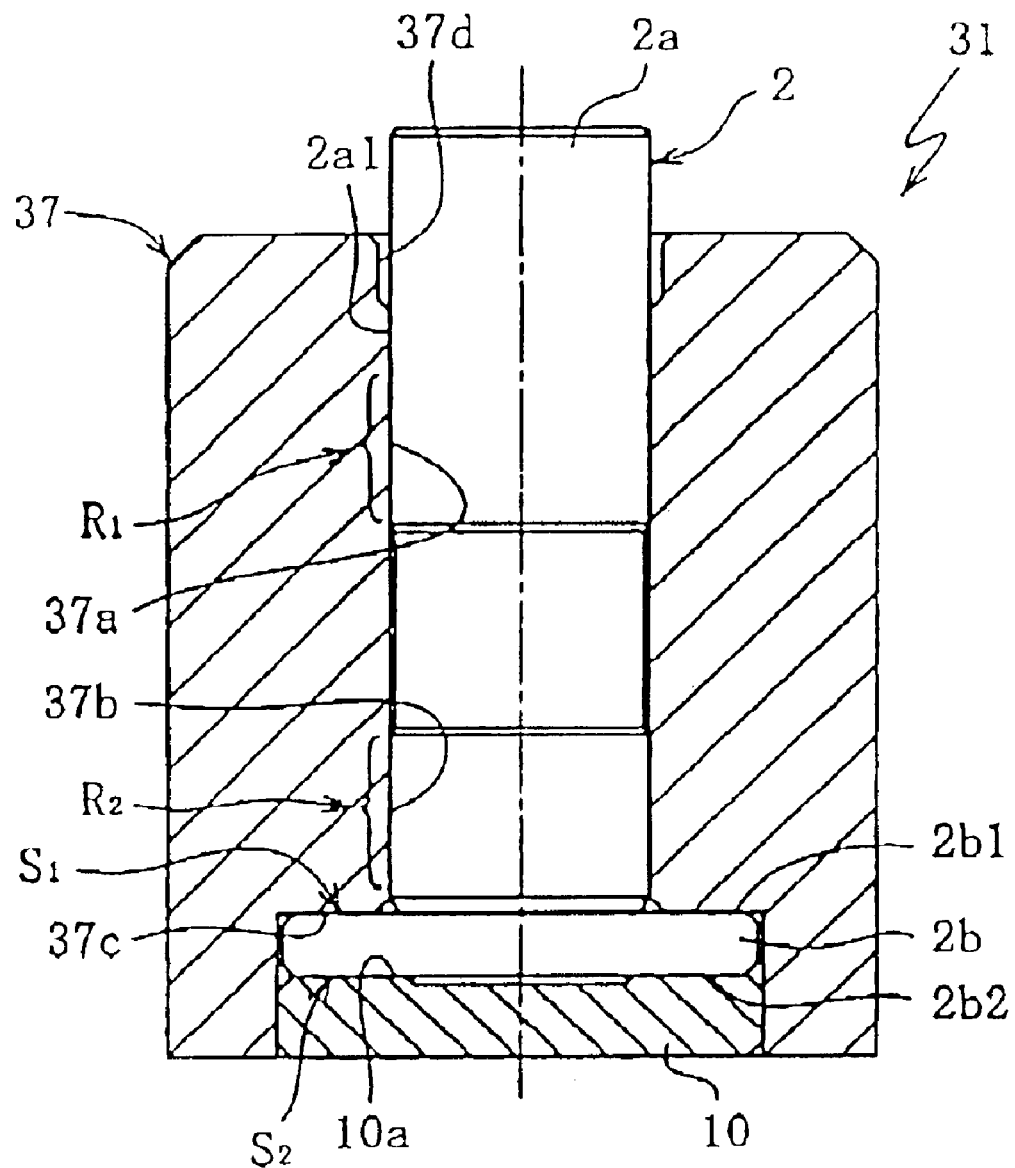
FIG. 14 is a cross-sectional view of a dynamic bearing device according to another embodiment of the present invention.

FIG. 14 shows a dynamic bearing device 31 according to another embodiment of the invention. The dynamic bearing device 31 comprises a housing 37, a thrust member 10 fixed to the housing 37, and an axis member 2. In addition, parts and locations that are substantially the same as those of the dynamic bearing device 1 shown in FIG. 2 are labeled with the same reference number and symbol, and their corresponding descriptions are omitted.

The housing 37, for example, is formed by the MIM method from metal powder such as magnesium, and comprises a radial bearing surface 37a of the first radial bearing portion R1, a radial bearing surface 37b of the second radial bearing portion R2, a thrust bearing surface 37c of the first thrust bearing portion S1, and a sealing surface 37d. For example, dynamic pressure generating grooves with a herringbone shape or a spiral shape are formed on the radial bearing surfaces 37a, 37b and the thrust bearing surface 37c. The dynamic pressure generating grooves are simultaneously formed (transferred by a mold) when molding the housing 37.

The dynamic bearing device 31 of this embodiment is, for example, assembled by processes described as follows.

First, the axis member 2 is installed into the housing 37. Then, the thrust member 10 is inserted (or may be press fitted) into the inner circumference of the lower end portion of the housing 37. The end face 10a of the thrust member 10 is thus in contact with the lower side end face 2b2 of the flange portion 2b, and at the same time, the upper side end face 2b1 of the flange portion 2b is in contact with the thrust bearing surface 37c. This stated is that the thrust bearing gap is zero, i.e., each of the thrust bearing gaps of the first thrust bearing portion S1 and the second thrust bearing portion S2 is respectively zero. Afterwards, the thrust member 10 is made to relatively move with respect to the housing 37 in the axial direction together with the axis member 2, with a dimension $\delta(\delta=\delta1+\delta2)$ that is equivalent to the sum of the thrust bearing gap (size is $\delta1$) of the first thrust bearing portion S1 and the thrust bearing gap (size is $\delta2$) of the second thrust bearing portion S2. Then, as the thrust member 10 is fixed to the housing 37 at that position, the predetermined thrust bearing gap $\delta(\delta=\delta1+\delta2)$ is formed.

According to the present invention, it is able to provide a dynamic bearing device in low cost and superior in bearing property.

In addition, according to the present invention, the thrust bearing gap can be accurately and simply set without being affected by the part accuracy. In this way, the processing cost of the parts or the assembling cost can be reduced.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A dynamic bearing device, comprising:

a housing;

a bearing sleeve fixed to an inner circumference of the housing;

an axis member having an axis portion and a flange portion;

a thrust member fixed to an one end portion of the inner circumference of the housing;

a radial bearing portion, arranged between an inner circumferential surface of the bearing sleeve and an outer circumferential surface of the axis portion, for supporting the axis portion in a non-contact manner in the radial direction under a dynamic action of lubrication oil generated in a radial bearing gap;

a first thrust bearing portion, arranged between one end face of the bearing sleeve and one end face of the flange portion opposite thereto, for supporting the flange portion in a non-contact manner in the thrust direction under a dynamic action of lubrication oil generated in a thrust bearing gap, wherein the one end of the inner circumference of the housing is a straight shape in an axial direction so as to be able to adjust a position of the thrust member with respect to the housing, and a second thrust bearing portion, arranged between an end face of the thrust member and the other end face of the flange portion opposite thereto, for supporting the flange portion in a non-contact manner in the thrust direction under a dynamic action of lubrication oil generated in a thrust bearing gap, wherein the position of the thrust member with respect to the housing is set, with using the one end face of the bearing sleeve positioned at a predetermined position on the housing as a reference, and thereby, the thrust bearing gaps of the first thrust bearing portion and the second thrust bearing portion are formed with a predetermined dimension.

2. The dynamic bearing device according to claim 1, further comprising a sealing means for sealing an internal space of the housing at a side of the other end face of the bearing sleeve.

3. The dynamic bearing device according to claim 2, wherein the sealing means is integrally formed with the housing.

4. The dynamic bearing device according to claim 2, the positioning of the bearing sleeve with respect to the housing is performed by making the other end face of the bearing sleeve contact with the sealing means.

5. The dynamic bearing device according to claim 1, the inner circumference of the housing is a continuous straight shape in the axial direction.

6. The dynamic bearing device according to claim 1, wherein a step portion is formed on the inner circumference of the housing, and by making one end of the bearing sleeve contact with the step portion, the positioning of the bearing sleeve with respect to the housing is performed.

7. The dynamic bearing device according to claim 1, wherein the bearing sleeve is made of a sintered metal.

8. The dynamic bearing device according to claim 1, wherein the housing and the bearing sleeve are integrally formed.

* * * * *